(12) United States Patent
Takeda et al.

(10) Patent No.: US 11,451,338 B2
(45) Date of Patent: Sep. 20, 2022

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN)

(73) Assignee: NTT DOCOMO, INC., Tokyo (JP)

(*) Notice: Subject to any disclaimer, the term of this patent is extended or adjusted under 35 U.S.C. 154(b) by 0 days.

(21) Appl. No.: 16/603,063

(22) PCT Filed: Apr. 5, 2017

(86) PCT No.: PCT/JP2017/014289
§ 371 (c)(1),
(2) Date: Oct. 4, 2019

(87) PCT Pub. No.: WO2018/185896
PCT Pub. Date: Oct. 11, 2018

(65) Prior Publication Data
US 2020/0112398 A1    Apr. 9, 2020

(51) Int. Cl.
*H04L 1/08* (2006.01)
*H04L 1/16* (2006.01)
(Continued)

(52) U.S. Cl.
CPC .............. *H04L 1/1671* (2013.01); *H04L 1/08* (2013.01); *H04L 1/1812* (2013.01);
(Continued)

(58) Field of Classification Search
CPC . H04W 72/04; H04W 88/08; H04W 72/0453; H04W 72/0406; H04L 1/0061;
(Continued)

(56) References Cited

U.S. PATENT DOCUMENTS

2012/0002657 A1* 1/2012 Seyama ............... H04L 1/1628
370/338
2018/0092109 A1* 3/2018 Belghoul .............. H04W 16/14
(Continued)

FOREIGN PATENT DOCUMENTS

| EP | 3 493 613 A1 | 6/2019 |
| JP | 2010-147755 A | 7/2010 |
| WO | 2010/109521 A1 | 9/2010 |

OTHER PUBLICATIONS

International Search Report issued in Application No. PCT/JP2017/014289, dated May 16, 2017 (5 pages).
(Continued)

*Primary Examiner* — Hassan A Phillips
*Assistant Examiner* — Prenell P Jones
(74) *Attorney, Agent, or Firm* — Osha Bergman Watanabe & Burton LLP

(57) ABSTRACT

The present invention is designed to control retransmission properly in smaller units than TBs (for example, in units of CBs or in units of CBGs). According to one example of the present invention, a user terminal has a receiving section that receives a transport block (TB) including one or more codeblock groups (CBG), a transmission section that transmits retransmission control information that indicates an ACK or a NACK in response to each CBG, and a control section that, when at least one CBG in the TB is subject to retransmission, determines the number of bits of the retransmission control information based on the total number of CBGs in the TB or the number of CBGs that are retransmitted.

5 Claims, 11 Drawing Sheets

(51) Int. Cl.
*H04L 1/18* (2006.01)
*H04L 5/00* (2006.01)
*H04W 72/04* (2009.01)
*H04L 1/00* (2006.01)

(52) U.S. Cl.
CPC ....... *H04L 5/0055* (2013.01); *H04W 72/0406* (2013.01); *H04L 1/0061* (2013.01); *H04W 72/0466* (2013.01)

(58) Field of Classification Search
CPC ....... H04L 5/0055; H04L 1/1812; H04L 1/08; H04L 1/1671
See application file for complete search history.

(56) References Cited

U.S. PATENT DOCUMENTS

| | | | | |
|---|---|---|---|---|
| 2018/0145703 | A1* | 5/2018 | Li | H04L 1/1816 |
| 2018/0270022 | A1* | 9/2018 | Sun | H04L 1/0061 |
| 2018/0287745 | A1* | 10/2018 | Sun | H03M 13/1111 |
| 2019/0074937 | A1* | 3/2019 | Bhattad | H04L 1/1896 |
| 2019/0191486 | A1* | 6/2019 | Myung | H04L 5/0094 |
| 2019/0207734 | A1* | 7/2019 | Yang | H04W 76/27 |
| 2019/0363833 | A1* | 11/2019 | Wang | H04W 72/042 |
| 2020/0059941 | A1* | 2/2020 | Belghoul | H04W 72/1215 |
| 2020/0195386 | A1* | 6/2020 | Marinier | H04L 1/1896 |
| 2020/0236587 | A1* | 7/2020 | Kim | H04L 1/1864 |
| 2020/0259599 | A1* | 8/2020 | Zhang | H04L 1/1864 |
| 2020/0274673 | A1* | 8/2020 | Yang | H04L 1/1864 |
| 2020/0366420 | A1* | 11/2020 | Gou | H04L 1/1854 |
| 2021/0068196 | A1* | 3/2021 | Akkarakaran | H04L 1/1671 |
| 2021/0105812 | A1* | 4/2021 | Rastegardoost | H04L 1/08 |

OTHER PUBLICATIONS

Written Opinion issued in International Application No. PCT/JP2017/014289, dated May 16, 2017 (4 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)" Mar. 2010, (149 pages).
3GPP TSG RAN WG1 Meeting #86bis; R1-162797; "HARQ Enhancement for Improved Data Channel Efficiency Document for Discussion;" MediaTek Inc.; Apr. 11-15, 2016; Busan, Korea (3 pages).
Extened Search Report issued in European Application No. 17904557.0, dated Oct. 20, 2020 (10 pages).
3GPP TSG RAN WG1 Meeting #88bis; R1-1705653; "Discussion on enhanced HARQ feedback and CBG-based partial retransmission;" Lenovo, Motorola Mobility; Apr. 3-7, 2017; Spokane, USA (5 pages).
3GPP TSG RAN WG1 Meeting #88bis; R1-1704463; "Considerations on CB grouping for multiple HARQ ACK/NACK pits per TB;" MediaTek Inc.; Apr. 3-7, 2017; Spokane USA (5 pages).
3GPP TSG RAN WG1 Meeting #88bis; R1-1704474; "On eMBB/URLLC DL Multiplexing Indication;" MediaTek Inc.; Apr. 3-7, 2017; Spokane, USA (5 pages).
Office Action issued in Japanese Application No. 2019-511009; dated May 11, 2021 (4 pages).
Office Action in counterpart European Patent Application No. 17 839 602.4 dated Apr. 26, 2021 (6 pages).
Office Action issued in Indian Application No. 201937040403; dated Jan. 27, 2022 (7 pages).

* cited by examiner

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower latency and so on (see non-patent literature 1). Also, the specifications of LTE-A (also referred to as "LTE-Advanced," "LTE Rel. 10 to 13," etc.) have been drafted for further broadbandization and increased speed beyond LTE (also referred to as "LTE Rel. 8 or 9"), and successor systems of LTE (also referred to as, for example, "FRA (Future Radio Access)," "5G (5th Generation mobile communication system)," "NR (New RAT (Radio Access Technology)," "LTE Rel. 14 and later versions," etc.) are under study.

In existing LTE systems (for example, Rel. 13 and earlier versions), adaptive modulation coding (AMC), which adaptively changes at least one of the modulation scheme, the transport block size (TBS), and the coding rate, is executed for link adaptation. Here, the TBS is the size of transport blocks (TBs), which are units of information bit sequences. One or more TBs are assigned to one subframe.

Also, in existing LTE systems, when TBS exceeds a predetermined threshold (for example, 6144 bits), a TB is divided into one or more segments (codeblocks (CBs)), and, coding is done on a per segment basis (codeblock segmentation). Each encoded codeblock is concatenated and transmitted.

Also, in existing LTE systems, retransmission (HARQ (Hybrid Automatic Repeat reQuest)) of DL signals and/or UL signals is controlled in TB units. To be more specific, in existing LTE systems, even when a TB is segmented into a plurality of CBs, retransmission control information ("ACK (ACKnowledgment)" or "NACK (Negative ACK)" (hereinafter abbreviated as "A/N" and also referred to as "HARQ-ACK" and the like) is transmitted in TB units.

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

Envisaging future radio communication systems (for example, 5G, NR, etc.), for example, it is predictable that larger TBS will be used in order to support communication of higher speed and larger capacity (EMBB (enhanced Mobile Broad Band)) than in existing LTE systems. TBs of such large TBS are likely to be segmented into many CBs compared to existing LTE systems (for example, one TB may be segmented into tens of CBs).

In this way, in future radio communication systems where the number of CBs per TB is anticipated to increase, when retransmission is controlled on a per TB basis as in existing LTE systems, even CBs in which no error is detected (which are successfully decoded) have to b retransmitted, and this may cause a decline in performance/throughput. Therefore, in future radio communication systems, it is desirable to control retransmission in smaller units than TBs (for example, per group (codeblock group (CBG)) comprised of one or more CBs).

The present invention has been made in view of the above, and it is therefore an object of the present invention to provide a user terminal and a radio communication method, whereby retransmission can be properly controlled in smaller units than TBs (for example, in CBG units).

Solution to Problem

According to one aspect of the present invention, a user terminal has a receiving section that receives a transport block (TB) including one or more codeblock groups (CBG), a transmission section that transmits retransmission control information that indicates an ACK or a NACK in response to each CBG, and a control section that, when at least one CBG in the TB is subject to retransmission, determines the number of bits of the retransmission control information based on the total number of CBGs in the TB or the number of CBGs that are retransmitted.

Advantageous Effects of Invention

According to the present invention, it is possible to control retransmission properly in smaller units than TBs (for example, in CBG units).

DESCRIPTION OF EMBODIMENTS

Figure 1:
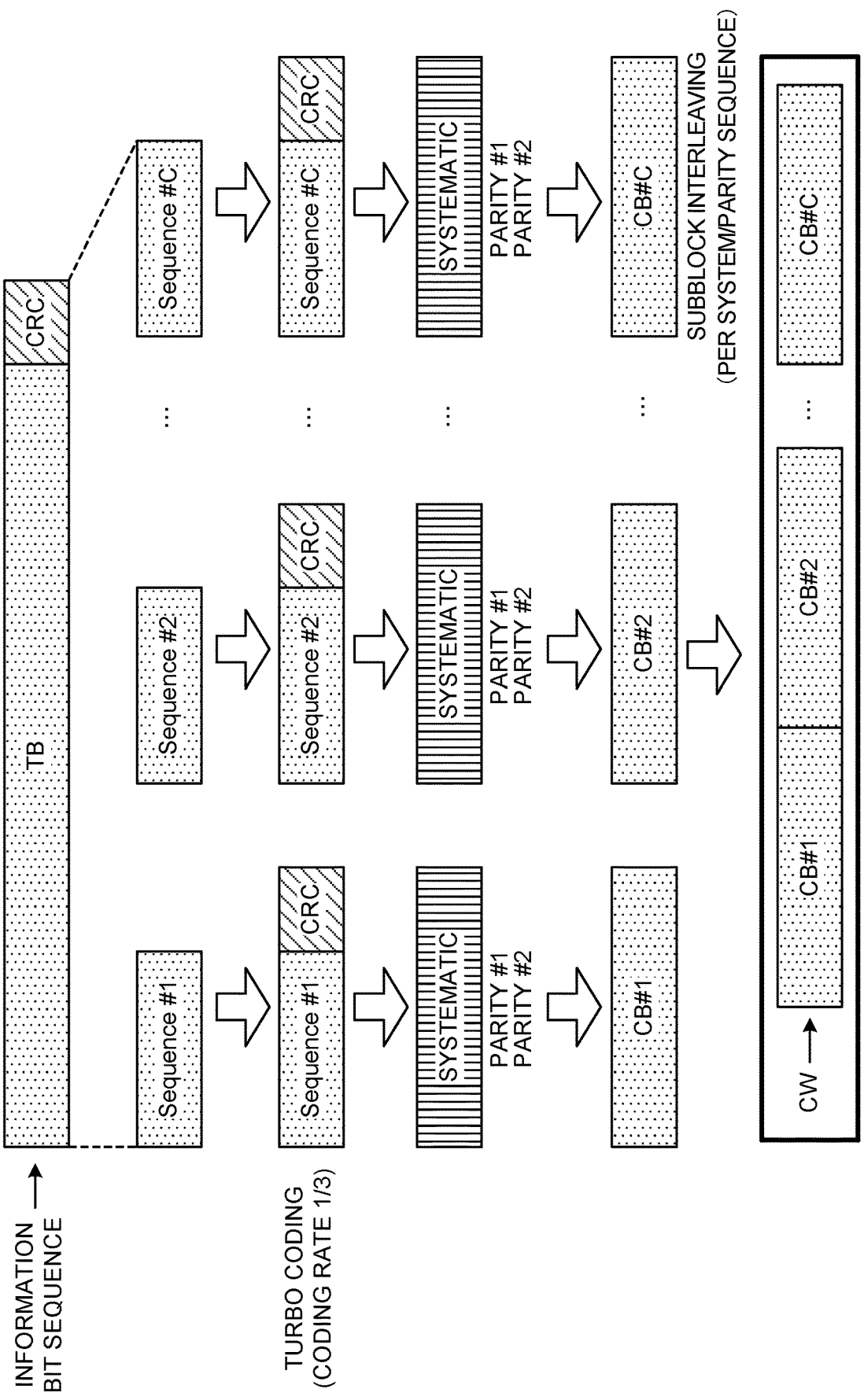
FIG. 1 is a diagram to show an example of transmission process where codeblock segmentation is employed.

FIG. 1 is a diagram to show an example of transmission process where codeblock segmentation is employed. When a transport block (hereinafter abbreviated as a "TB"), to which CRC (Cyclic Redundancy Check) bits are attached (that is, an information bit sequence including CRC bits), exceeds a predetermined threshold (for example, 6144 bits or 8192 bits, etc.), codeblock segmentation refers to dividing this TB into a plurality of segments. Codeblock segmentation is executed, for example, to adjust the TBS to a size that is compatible with the encoder, and the above predetermined threshold may be equal to the maximum size that is compatible with the encoder.

As shown in FIG. 1, when the TB size (TBS) exceeds a predetermined threshold (for example, 6144 bits or 8192 bits, etc.), this information bit sequence, including CRC bits, is divided (segmented) into a plurality of segments on the transmitting side. Note that filler bits may be appended to the top of segment #1.

As shown in FIG. 1, each segment is attached CRC bits (for example, 24 bits), and subjected to channel coding (for example, turbo coding, low-density parity-check (LDPC) coding, etc.) at a predetermined coding rate (for example, ⅓, ¼, ⅛, etc.). By means of this channel coding, systematic bits and parity bits (first and second parity bits (#1 and #2)) are generated as code bits of each codeblock (hereinafter abbreviated as "CB").

Each CB is interleaved in a predetermined manner, has a bit sequence of an amount to match the amount of scheduled resources selected, and transmitted. For example, the systematic bit sequence, the first parity bit sequence and the second parity bit sequence are all interleaved individually (subblock interleaving). After this, the systematic bit sequence, the first parity bit sequence and the second parity bit sequence are each input to a buffer (circular buffer), and, based on the number of REs that are available in allocated resource blocks, the redundancy version (RV) and so on code bits for each CB are selected from the buffer (rate matching). Interleaving may be applied between multiple CBs as well.

Each CB, comprised of selected code bits, is concatenated to form a codeword (CW). The codeword is subjected to scrambling, data modulation and so on, and then transmitted.

Figure 2:
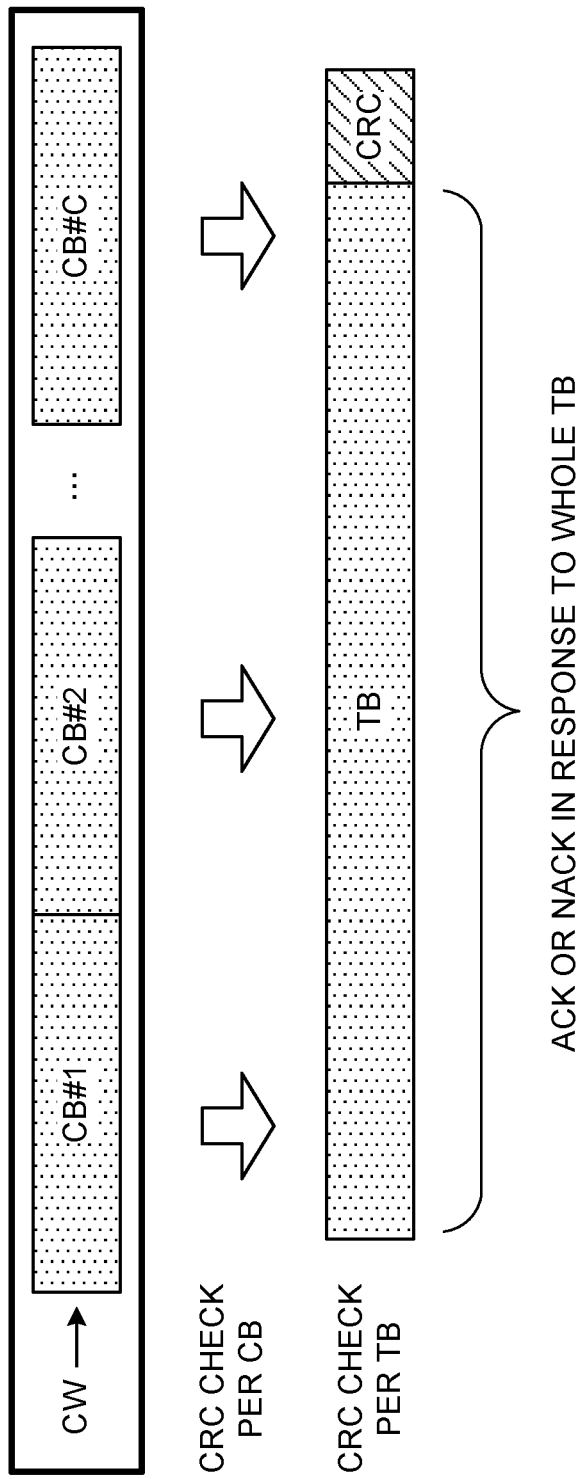
FIG. 2 is a diagram to show an example of receiving process where codeblock segmentation is employed.

FIG. 2 is a diagram to show an example of receiving process where codeblock segmentation is employed. On the receiving side, the TBS is determined based on the TBS index and the number of resource blocks allocated (for example, PRBs (Physical Resource Block)), and, based on the TBS, the number of CBs is determined.

As shown in FIG. 2, on the receiving side, each CB is decoded, and error detection of each CB is performed using the CRC bits appended to each CB. Also, codeblock segmentation is undone, so as to recover the TB. Furthermore, error detection of the whole TB is performed using the CRC bits appended to the TB.

At the receiving side in existing LTE systems, retransmission control information (which is also referred to as "ACK" or "NACK," and which hereinafter will be abbreviated as "A/N" or referred to as "HARQ-ACK") in response to the whole of the TB is transmitted to the transmitting side, based on the error detection result of the whole TB. On the transmitting side, the whole TB is retransmitted in response to a NACK from the receiving side.

Figure 3:
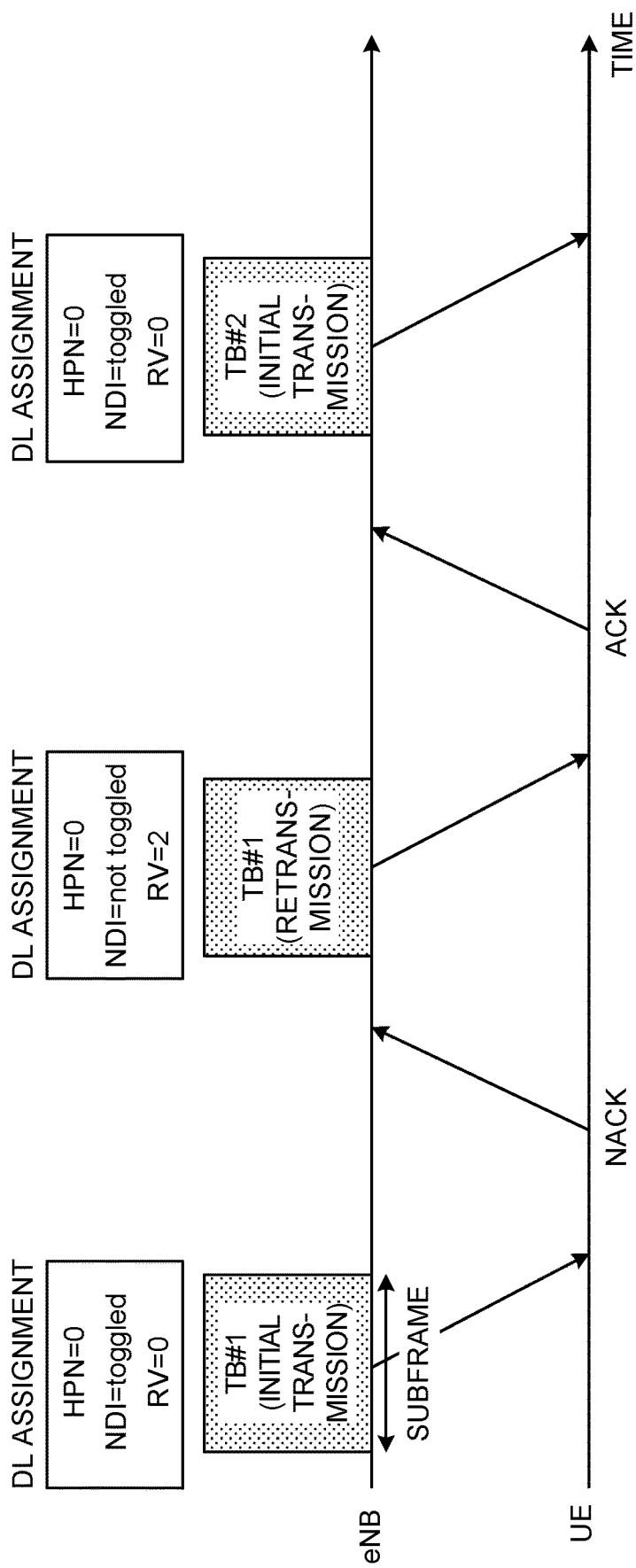
FIG. 3 is a diagram to show an example of DL retransmission control in an existing LTE system.

FIG. 3 is a diagram to show an example of retransmission control for DL signals in an existing LTE system. In existing LTE systems, retransmission control is executed on per a TB basis, irrespective of whether or not a TB is divided into a plurality of CBs. To be more specific, HARQ processes are assigned on a per TB basis. Here, HARQ processes are processing units in retransmission control, and every HARQ process is identified by a HARQ process number (HPN). One or more HARQ processes are configured in a user terminal (UE (User Equipment)), and, in the HARQ process of the same HPN, the same data keeps being retransmitted until an ACK is received.

For example, referring to FIG. 3, HPN=0 is assigned to TB #1 for initial transmission. Upon receiving a NACK, the radio base station (eNB (eNodeB)) retransmits same TB #1 in HPN=0, and, upon receiving an ACK, the radio base station transmits next TB #2, for the first time, in HPN=0.

Also, in downlink control information (DCI) (DL assignment) that allocates the DL signal (for example, a PDSCH) for transmitting TBs, the radio base station can include the above HPN, a new data indicator (NDI) and a redundancy version (RV).

Here, the NDI is an indicator to distinguish between initial transmission and retransmission. For example, the NDI indicates retransmission if the NDI is not toggled in the same HPN (has the same value as the previous value), and indicates initial transmission if the NDI is toggled (has a different value from the previous value).

In addition, the RV indicates the difference in the redundancy of transmission data. The values of RVs include, for example, 0, 1, 2 and 3, where 0 indicates the lowest degree of redundancy, and is used for initial transmission. By applying a different RV value to every transmission with the same HPN, HARQ gain can be achieved effectively.

For example, in FIG. 3, the DCI in TB #1 of initial transmission contains the HPN "0," a toggled NDI, and the RV value "0." Therefore, the user terminal can recognize that the HPN "0" indicates initial transmission, and decodes TB #1 based on the RV value "0." On the other hand, the DCI in the retransmission of TB #1 includes the HPN "0," an untoggled NDI, and the RV value "2." Therefore, the user terminal can recognize that the HPN "0" indicates retransmission, and decodes TB #1 based on the RV value "2." The initial transmission of TB #2 is the same as the initial transmission of TB #1.

As described above, in existing LTE systems, retransmission control is executed on a per TB basis, regardless of whether or not codeblock segmentation is employed. For this reason, when codeblock segmentation is employed, if errors concentrate in a portion of C (C>1) CBs that are formed by dividing a TB, the whole TB is retransmitted.

Therefore, not only CBs in which errors are detected (and which therefore fail to be decoded), but also CBs in which errors are not detected (successfully decoded) have to be retransmitted, which might cause a decline in performance (throughput). Future radio communication systems (for example, 5G, NR, etc.) are anticipated to have increased cases where a TB is segmented into many CBs (for example, tens of CBs), and where the decline in performance is significant when retransmission is controlled in units of TBs.

Therefore, it is required to control retransmission in smaller units than TBs (for example, in CBG units). In this case, the user terminal needs to transmit retransmission control information that indicates ACKs and/or NACKs in smaller units than TBs. So the present inventors have worked on a method of transmitting retransmission control information that indicates ACKs and/or NACKs in smaller units than TBs, and arrived at the present invention.

Now, embodiments of the present invention will be described below in detail with reference to the accompanying drawings. Note that, although the present embodiment will be described below assuming asynchronous retransmission control (asynchronous HARQ), the present embodiment can be appropriately applied to synchronized retransmission control (synchronous HARQ) as well. In synchronous HARQ, retransmission of each HARQ process is carries out after a certain period from the initial transmission. On the other hand, in asynchronous HARQ, retransmission of each HARQ process is carried out after an unspecified period from the initial transmission of UL data.

Also, although the present embodiment will assume the use of a DL data channel (for example, PDSCH (Physical Downlink Shared CHannel)) as a DL signal, this is by no means limiting. For example, the retransmission control according to the present embodiment can also be applied to retransmission control of, for example, random access response (RAR). Also, the present embodiment can also be applied to UL signals such as UL data channels (for example, PUSCH (Physical Uplink Shared CHannel)).

Also, the transport block (TB) according to the present embodiment is the unit of information bit sequences, and may be, for example, at least one of the information bit sequence unit allocated to one subframe, the unit of scheduling and so on. Also, the TB may or may not include CRC bits.

The codeblock (CB) according to the present embodiment is the unit of information bits that can be input to the encoder (for example, turbo encoder). In the event the TBS is less than or equal to the size that is compatible with the encoder (maximum coding size), a TB may be referred to as a "CB." Also, in the event the TBS exceeds the compatible size with the encoder, a TB may be divided into multiple segments, and each segment may be referred to as a "CB." Note that the transmission process and the receiving process as described above with reference to FIG. 1 and FIG. 2 when codeblock segmentation is applied are merely examples, and the present embodiment can be applied to any transmission process and receiving process in which CBs or CBGs are used.

First Example

According to the first example of the present invention, a user terminal receives a TB, comprised of one or more CBGs, and transmits information, which includes retransmission control information that indicates ACK or NACK per CBG (also referred to as "A/N bits," "A/N codeblock," etc.). When at least one CBG in this TB is subject to retransmission, the user terminal determines the number of bits of the retransmission control information (also referred to as "A/N codeblock size," etc.) based on the total number of CBGs in the TB.

To be more specific, when at least one CBG in the TB is subject to retransmission (including when some of the CBGs in the TB are subject to retransmission), the user terminal may determine the number of bits of the retransmission control information to be equal to the total number of CBGs in the TB. Also, when at least one CBG in the TB is subject to retransmission (including when some of the CBGs in the TB are subject to retransmission), the retransmission control information may indicate ACK or NACK in response to all the CBGs in the TB.

Also, according to the first example, the user terminal may receive information related to a CBG that is retransmitted (also referred to as a "retransmitting CBG") (for example, at least one of the index (CBG index), the HPN, the NDI and the RV of the retransmitting CBG). Note that, although HARQ processes will be allocated on a per TB basis in the following description, HARQ processes may be allocated on a per CBG basis as well.

Figure 4:
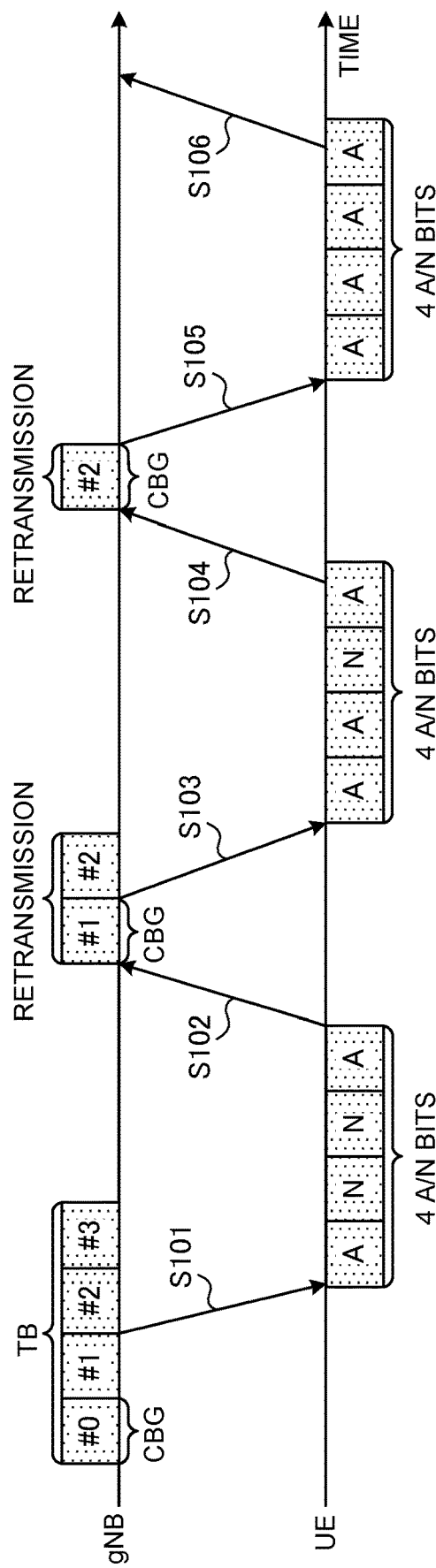
FIG. 4 is a diagram to show an example of transmission of retransmission control information according to a first example of the present invention.

FIG. 4 is a diagram to show an example of transmission of retransmission control information according to the first example. FIG. 4 exemplifies the case where 1 TB contains 4 CBGs, but this is by no means limiting, and the number of CBGs in 1 TB may be at least 1. Each CBG also contains one or more CBs.

Now, referring to FIG. 4, a radio base station (gNB) schedules and transmits a TB comprised of CBGs #0 to #3 (step S101). To be more specific, the radio base station transmits downlink control information (DCI) (DL assignment), which includes scheduling information pertaining to the TB, and transmits the TB via the PDSCH. Note that this DCI may contain information related to each CBG in the TB (for example, at least one of each CBG's CBG index, HPN, NDI and RV).

The user terminal receives the TB, via the PDSCH, based on DCI from the radio base station. The user terminal transmits retransmission control information, which is generated based on the result of demodulation and/or decoding (demodulation/decoding) of each CBG (step S102). As shown in FIG. 4, this retransmission control information may indicate an ACK or a NACK in response to each CBG. Note that, when it fails to demodulate/decode at least one CB in the CBG, a NACK is indicated in response to this CBG.

For example, referring to FIG. 4, the user terminal successfully demodulates/decodes CBG #0 and #3, but fails to demodulate/decode CBGs #1 and #2. Therefore, the user terminal generates 4-bit retransmission control information (4 A/N bits) that indicates an ACK for CBG #0, NACKs for CBG #1 and CBG #2, and an ACK for CBG #3.

The user terminal transmits the generated retransmission control information via a UL control channel (for example, PUCCH (Physical Uplink Control CHannel)) or a UL data channel (for example, PUSCH). As shown in FIG. 4, when transmitting 4-bit retransmission control information, the user terminal may use PUCCH format 3. Also, the retransmission control information may be transmitted as uplink control information (UCI). The UCI may include at least one of the retransmission control information, a scheduling request (SR) and channel state information (CSI).

The radio base station retransmits CBGs #1 and #2, which correspond to the NACKs indicated in the retransmission control information reported from the user terminal, in step S102 (step S103). To be more specific, the radio base station transmits DCI that contains scheduling information pertaining to retransmitting CBGs #1 and #2, and transmits these retransmitting CBGs #1 and #2 via the PDSCH. This DCI may include information related to retransmitting CBGs #1 and #2 (for example, at least one of the CBG indices, HPNs, NDIs and RVs of retransmitting CBGs #1 and #2).

The user terminal receives retransmitting CBGs #1 and #2 based on the DCI from the radio base station. The user terminal generates and transmits retransmission control information that indicates ACKs or NACKs in response to all of CBGs #0 to #3 in the TB, based on the demodulation/decoding results of retransmitting CBGs #1 and #2 (step S104). Note that the user terminal may combine retransmitting CBGs #1 and #2 with data that is stored in the user terminal (its soft buffer), and generate the retransmission control information based on the result of this combining.

For example, referring to FIG. 4, the user terminal demodulates/decodes retransmitting CBG #1 successfully, but fails to demodulate/decode retransmitting CBG #2. Therefore, the user terminal generates 4-bit retransmission control information that indicates ACKs for CBGs #0 and #1, a NACK for CBG #2 and an ACK for CBG #3, and transmits this by using the PUCCH or the PUSCH.

The radio base station retransmits CBG #2, which corresponds to the NACK indicated in the retransmission control information reported from the user terminal in step S104 (step S105). To be more specific, the radio base station transmits DCI, which includes scheduling information pertaining to retransmitting CBG #2, and transmits this retransmitting CBG #2 via the PDSCH. This DCI may include information related to retransmitting CBG #2 (for example, at least one of the CBG index, the HPN, the NDI and the RV of retransmitting CBG #2).

The user terminal receives retransmitting CBG #2 based on the DCI from the radio base station. The user terminal generates and transmits retransmission control information that indicates ACKs or NACKs in response to all of CBGs #0 to #3 in the TB based on the demodulation/decoding result of retransmitting CBG #2 (step S106). CBG #2, which is subject to retransmission as described above, may be combined with data that is stored in the user terminal (its soft buffer).

For example, referring to FIG. 4, retransmitting CBG #2 is demodulated/decoded successfully, so that the user terminal generates 4-bit retransmission control information that indicates ACKs in response to CBGs #0 to #3, and transmits this by using the PUCCH or the PUSCH.

In this way, referring to FIG. 4, when at least one CBG in the TB is subject to retransmission, retransmission control information that not only indicates the retransmitting CBG but that also indicates ACKs/NACKs in response to all the CBGs in the TB is reported to the radio base station. Therefore, even when the radio base station misidentifies a NACK in response to a certain CBG for an ACK ("NACK-to-ACK error"), the radio base station can still retransmit this CBG based on subsequent retransmission control information that indicates a NACK for this CBG.

Note that, as shown in FIG. 4, given that ACKs are reported in response to CBGs #0 and #3 in step S102, ACKs are reported again in steps S104 and S106. In this way, as shown in FIG. 4, once an ACK is reported in response to a given CBG, subsequent retransmission control information also reports an ACK in response to this CBG, but this later retransmission control information is also allowed to report a NACK in response to this CBG.

For example, if the understanding as to which CBGs are retransmitted does not match between the radio base station and a user terminal, combining a retransmitting CBG with another CBG's data stored in the user terminal is more likely to result in a failure of decoding. In this case, assuming that there is a CBG where previous retransmission control information reported an ACK, subsequent retransmission control information might report a NACK. Therefore, the radio base station may include information to identify this retransmitting CBG (that is, information to indicate which CBGs are retransmitted) (for example, at least one of the CB index, the HPN and the NDI), in DCI that contains scheduling information pertaining to retransmitting CBGs, so as to prevent an inconsistency in understanding as to which CBGs are subject to retransmission, between the radio base station and the user terminal.

As described above, according to the first example, when at least one CBG in a TB is subject to retransmission, retransmission control information that not only indicates an ACK/NACK for this retransmitting CBG, but that also indicates only ACKs/NACKs in response to all the CBGs in the TB is reported, so that, even when a NACK-to-ACK error occurs with respect to a certain CBG at a radio base station, it is still possible to provide an opportunity for retransmitting this CBG.

Second Example

A second example of the present invention differs from the first example in that, when at least one CBG in a TB is subject to retransmission, a user terminal determines the number of bits of retransmission control information (also referred to as "A/N codeblock size," etc.) based on the number of retransmitting CBGs, instead of the total number of CBGs in the TB. Differences from the first example will be primarily described below.

To be more specific, in the event at least one CBG in a TB is subject to retransmission, the user terminal may determine the number of bits of retransmission control information to be equal to the number of retransmitting CBGs. Also, when at least one CBG in a TB is subject to retransmission, the retransmission control information may indicate an ACK or a NACK in response to this retransmitting CBG.

Also, in the second example, the user terminal may receive information related to this retransmitting CBG (for example, at least one of the index (CBG index), the HPN, the NDI and the RV of this retransmitting CBG).

Figure 5:
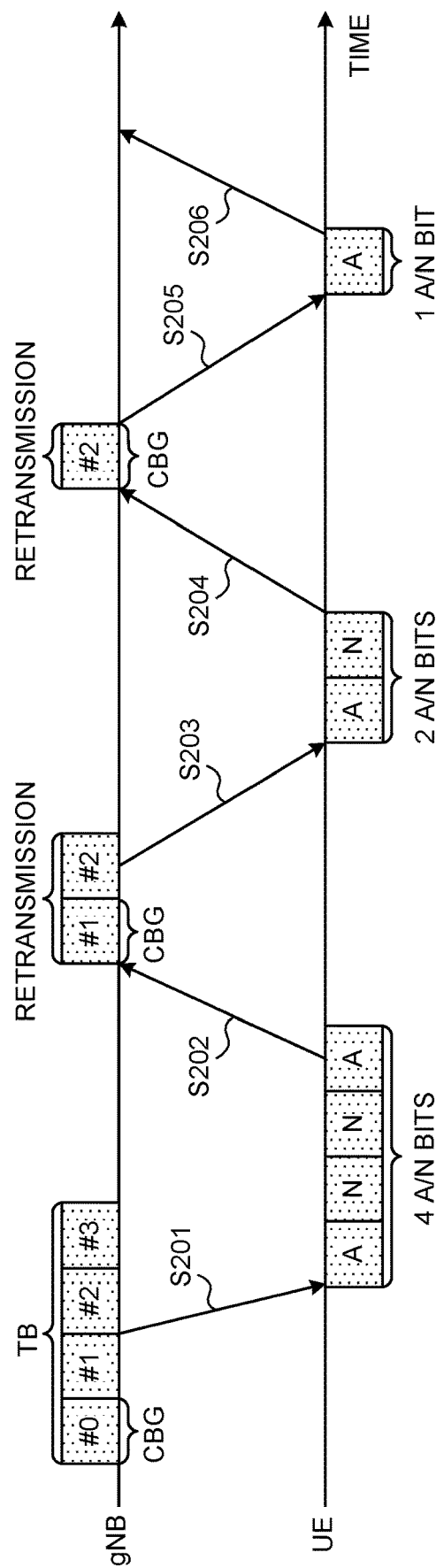
FIG. 5 is a diagram to show an example of transmission of retransmission control information according to a second example of the present invention.

FIG. 5 is a diagram to show an example of transmission of retransmission control information according to the second example. Similar to FIG. 4, FIG. 5 shows a case where 1 TB contains 4 CBGs. Note that steps S201 to S203 of FIG. 5 are the same as steps S101 to S103 of FIG. 4. Differences from FIG. 4 will be primarily described below.

As shown in FIG. 5, the user terminal generates 2-bit retransmission control information (2 A/N bits) that indicate ACKs or NACKs in response to retransmitting CBGs #1 and #2 based on the demodulation/decoding results of CBGs #1 and #2, and transmits this retransmission control information by using the PUCCH or the PUSCH (step S204).

For example, in FIG. 5, the user terminal successfully demodulates/decodes retransmitting CBG #1, but fails to demodulate/decode CBG #2. Therefore, the user terminal generates 2-bit retransmission control information that indicates an ACK for CBG #1 and a NACK for CBG #2, and transmits this by using the PUCCH or the PUSCH.

The radio base station retransmits CBG #2 that corresponds to the NACK indicated in the retransmission control information reported from the user terminal in step S204 (step S205). The user terminal generates and transmits 1-bit retransmission control information (1 A/N bit) that indicates an ACK or a NACK in response to retransmitting CBG #2 based on the demodulation/decoding result of this retransmitting CBG #2 (step S206).

In FIG. 5, once an ACK is reported with respect to a certain CBG, the user terminal cannot change this CBG's ACK to a NACK and report this. Therefore, the radio base station may include information to identify this retransmitting CBG (for example, at least one of the CB index, the HPN and the NDI), in DCI that contains scheduling information pertaining to retransmitting CBGs, so as to prevent an inconsistency in understanding as to which CBGs are subject to retransmission, between the radio base station and the user terminal.

Also, in FIG. 5, when at least one CBG in a TB is retransmitted, retransmission control information indicating only ACKs/NACKs in response to the retransmitting CBGs is reported. Therefore, even when the radio base station misidentifies a NACK in response to a retransmitting CBG as an ACK ("NACK-to-ACK error"), this retransmitting CBG is never retransmitted, and the user terminal cannot receive this retransmitting CBG. Meanwhile, since the number of bits of retransmission control information which the user terminal reports can be adjusted based on the number of retransmitting CBGs, the overhead can be effectively reduced.

Furthermore, in FIG. 5, the user terminal may change the PUCCH format according to the number of bits of retransmission control information. For example, as shown in step S201, when the user terminal transmits 4-bit retransmission control information, the user terminal may use PUCCH format 3, and as shown in step S204 or S206, when the user terminal transmits 2-bit or 1-bit retransmission control information, the user terminal may use PUCCH format 1a or 1b. Furthermore, the user terminal may change at least one of the coding scheme, the number of PUCCH-transmitting symbols, and the PUCCH transmission power according to the number of bits of retransmission control information.

As described above, according to the second example, when at least one CBG in a TB is subject to retransmission, the user terminal reports retransmission control information that indicates ACKs/NACKs in response to the retransmitting CBGs, so that it is possible to adjust the number of bits of retransmission control information according to the number of retransmitting CBGs, and to reduce the overhead accompanying the reporting of retransmission control information.

Note that the retransmission control information may include a bit that represents an A/N in response to the TB as a whole. This A/N in response to the whole TB is an ACK when CRC check is all done for all CBGs. Therefore, as long as errors remain, the user terminal makes this bit a NACK. In this way, even when an error remains for some reason and this bit indicates a NACK, the radio base station can recognize that the user terminal has not received the TB successfully, and resolve the remaining error by taking measures such as retransmitting the entire TB next.

Other Examples

In step S103 of FIG. 4 and step S203 of FIG. 5, retransmitting CBGs #1 and #2 may be bundled and transmitted with a TB or a retransmitting CBG where different HPNs from those of retransmitting CBGs #1 and #2 are assigned. The same applies to step S105 of FIG. 4 and step S205 of FIG. 5.

In this case, in step S104 of FIG. 4, the user terminal may transmit retransmission control information that indicates ACKs/NACKs in response to a TB (or all the CBGs in this TB) to which different HPNs are assigned, or ACKs/NACKs in response to all the CBGs in a TB including retransmitting CBGs to which different HPNs are assigned, in addition to ACKs or NACKs in response to all the CBGs in the TB including retransmitting CBGs #1 and #2. The same applies to step S106 of FIG. 4.

Also, in step S204 of FIG. 5, the user terminal may transmit retransmission control information that indicates ACKs/NACKs in response to a TB (or all the CBGs in this TB) to which different HPNs are assigned, or ACK/NACK in response to retransmitting CBG to which different HPNs are assigned, in addition to ACKs or NACKs in response to all the CBGs in the TB including retransmitting CBGs #1 and #2. The same applies to step S206 of FIG. 5.

In the above description, retransmission control information to indicate ACKs/NACKs per CBG has been described, but retransmission control information to indicate ACKs/NACKs per CB can also be applied as appropriate. Furthermore, although transmission control for retransmission control information for each CBG or CB of DL signals by a user terminal has been described with the first and second examples, the first and second examples can also be applied to transmission control for retransmission control information for each CBG or CB of UL signals by a radio base station.

Also, the number of CBs per CBG may be reported (configured) from the radio base station to the user terminal via higher layer signaling.

(Radio Communication System)

Now, the structure of a radio communication system according to the present embodiment will be described below. In this radio communication system, the radio communication methods according to the above-described embodiments are employed. Note that the radio communication method according to each embodiment described above may be used alone or may be used in combination.

Figure 6:
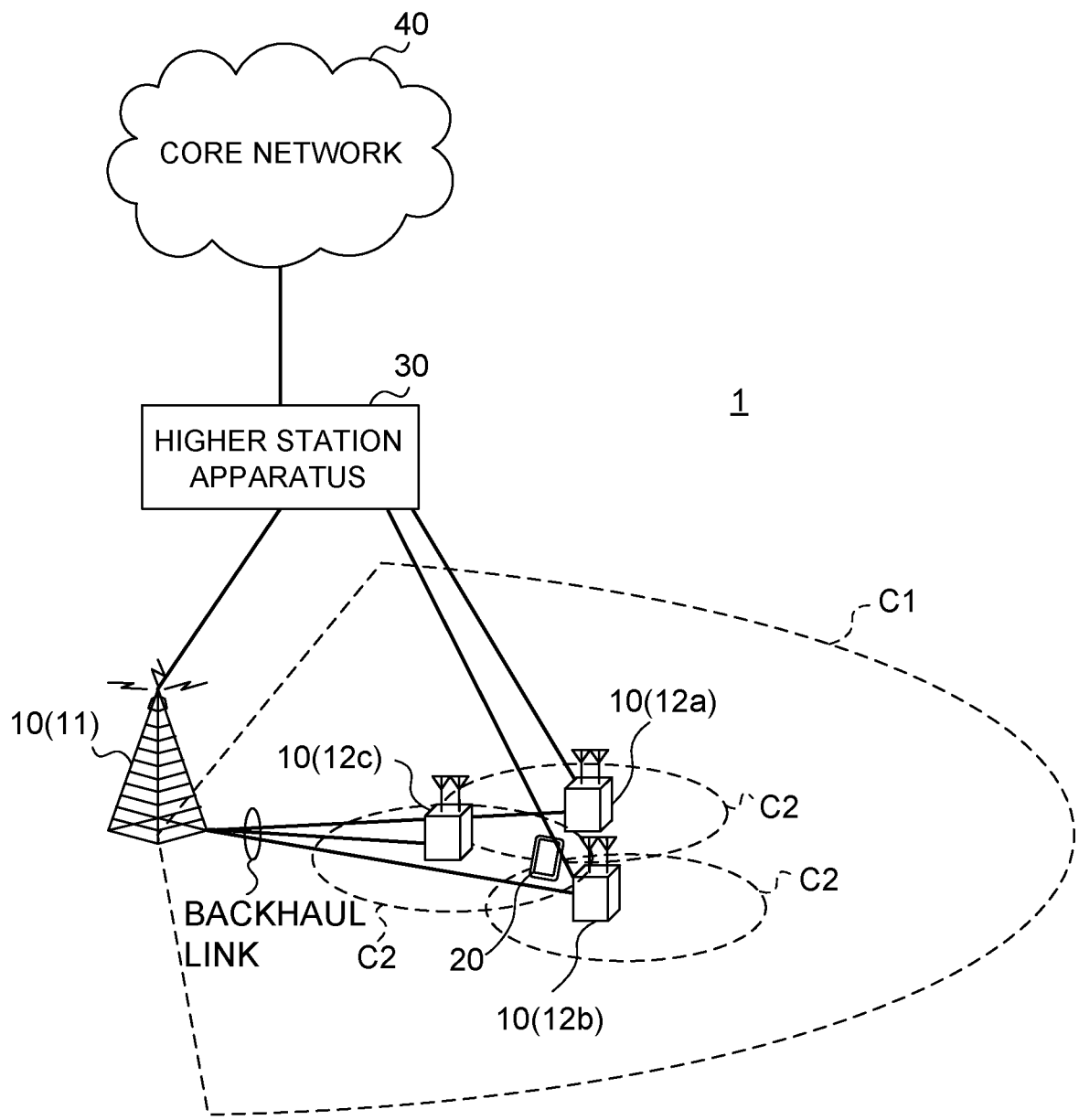
FIG. 6 is a diagram to show an exemplary schematic structure of a radio communication system according to the present embodiment.

FIG. 6 is a diagram to show an exemplary schematic structure of a radio communication system according to the present embodiment. A radio communication system 1 can adopt carrier aggregation (CA), which groups a number of fundamental frequency blocks (component carriers (CCs)) into one, where an LTE system bandwidth (for example, 20 MHz) is used as one unit, and/or dual connectivity (DC). Note that the radio communication system 1 may be referred to as "SUPER 3G," "LTE-A (LTE-Advanced)," "IMT-Advanced," "4G," "5G," "FRA (Future Radio Access)," "NR (New RAT)" and so on.

The radio communication system 1 shown in FIG. 6 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2. A structure in which different numerologies are applied between cells may be adopted here. Note that a "numerology" refers to a set of communication parameters that characterize the design of signals in a given RAT, the design of a RAT and so on.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, two or more CCs). Furthermore, the user terminals can use licensed-band CCs and unlicensed-band CCs as a plurality of cells.

Furthermore, the user terminals 20 can communicate based on time division duplexing (TDD) or frequency division duplexing (FDD) in each cell. A TDD cell and an FDD cell may be referred to as a "TDD carrier (frame structure type 2)" and an "FDD carrier (frame structure type 1)," respectively.

Also, in each cell (carrier), either subframes having a relatively long time length (for example, 1 ms) (also referred to as "TTIs," "normal TTIs," "long TTIs," "normal subframes," "long subframes," "slots," and/or the like), or subframes having a relatively short time length (also referred to as "short TTIs," "short subframes," "slots" and/or the like) may be applied, or both long subframes and short subframe may be used. Furthermore, in each cell, subframes of two or more time lengths may be used.

Between the user terminals 20 and the radio base station 11, communication can be carried out using a carrier of a relatively low frequency band (for example, 2 GHz) and a narrow bandwidth (referred to as, for example, an "existing carrier," a "legacy carrier," and/or the like). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals. Furthermore, the user terminals 20 can perform device-to-device (D2D) communication with other user terminals 20.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combination of these, and OFDMA may be used in the UL. Also, SC-FDMA can be applied to a side link (SL) that is used in inter-terminal communication.

DL channels that are used in radio communication system 1 include DL data channel that is shared by each user terminal 20 (also referred to as "PDSCH (Physical Downlink Shared CHannel)," "DL shared channel" and so forth), a broadcast channel (PBCH (Physical Broadcast CHannel)), L1/L2 control channels and so on. User data, higher layer control information, SIBs (System Information Blocks) and so forth are communicated in the PDSCH. Also, the MIB (Master Information Block) is communicated in the PBCH.

The L1/L2 control channels include DL control channels (such as PDCCH (Physical Downlink Control CHannel), EPDCCH (Enhanced Physical Downlink Control CHannel), etc.), PCFICH (Physical Control Format Indicator CHannel), PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. The EPDCCH is frequency-division-multiplexed with the PDSCH and used to communicate DCI and so on, like the PDCCH. PUSCH retransmission control information (A/Ns, HARQ-ACKs, etc.) can be communicated in at least one of the PHICH, the PDCCH and the EPDCCH.

UL channels that are used in the radio communication system 1 include UL data channel that is shared by each user terminal 20 (also referred to as "PUSCH (Physical Uplink Shared CHannel)," "UL shared channel" and/or the like), a UL control channel (PUCCH (Physical Uplink Control CHannel)), a random access channel (PRACH (Physical Random Access CHannel)) and so on. User data, higher layer control information and so on are communicated by the PUSCH. Uplink control information (UCI), including at least one of retransmission control information for PDSCH (for example, A/N, HARQ-ACK), channels state information (CSI), is communicated in the PUSCH or the PUCCH. By means of the PRACH, random access preambles for establishing connections with cells are communicated.

(Radio Base Station)

Figure 7:
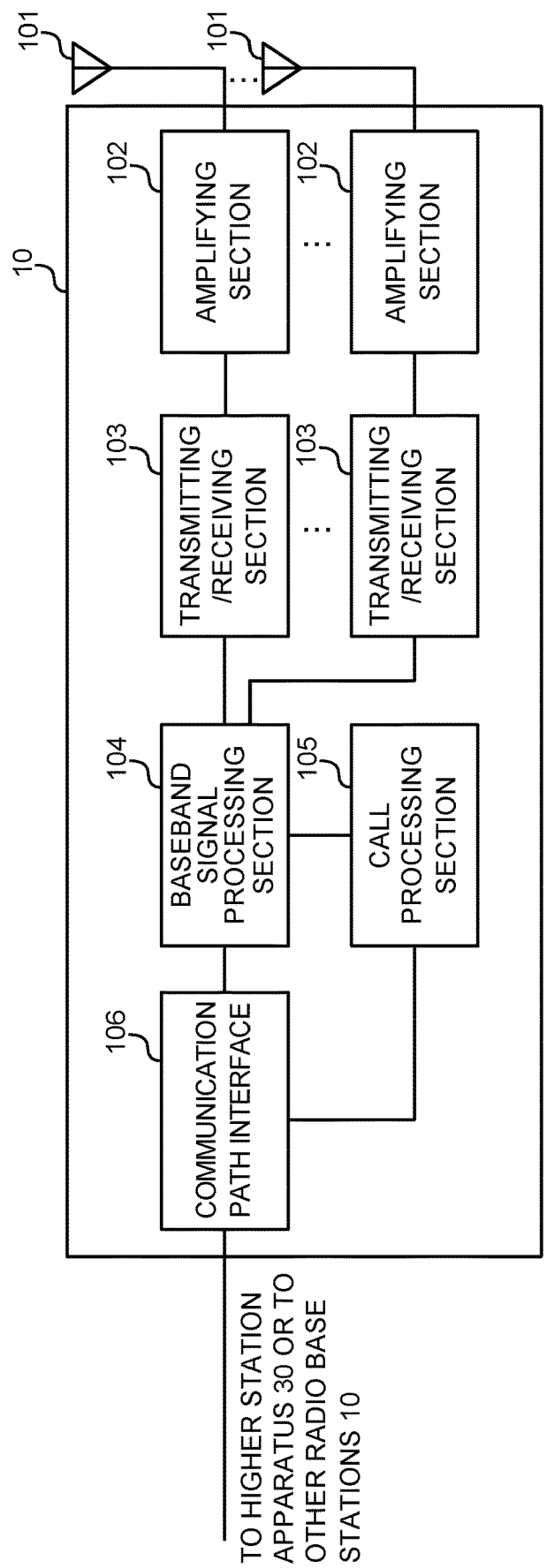
FIG. 7 is a diagram to show an exemplary overall structure of a radio base station according to the present embodiment.

FIG. 7 is a diagram to show an exemplary overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to the transmitting/receiving sections 103. Furthermore, downlink control signals are also subjected to transmission processes such as channel coding and an inverse fast Fourier transform, and forwarded to the transmitting/receiving sections 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

A transmitting/receiving section 103 can be constituted by a transmitters/receiver, a transmitting/receiving circuit or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, UL data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. Also, the communication path interface 106 may transmit and receive signals (backhaul signaling) with neighboring radio base stations 10 via an inter-base station interface (which is, for example, optical fiber in compliance with the CPRI (Common Public Radio Interface), the X2 interface, etc.).

In addition, the transmitting/receiving sections 103 transmit DL signals (for example, at least one of DCI (DL assignment for scheduling DL data and/or UL grant for scheduling UL data), DL data and DL reference signals), and receive UL signals (for example, at least one of UL data, UCI, and UL reference signals).

In addition, the transmitting/receiving sections 103 receive retransmission control information (also referred to as "ACK/NACK," "A/N," "HARQ-ACK," "A/N codeblock," etc.) related to DL signals. As to how often the retransmission control information is transmitted, for example, the retransmission control information may be transmitted per CB, per CBG, per TB or for every one or more TBs (that is, ACKs or NACKs may be indicated per CB, per CBG, per TB or for every one or more TBs). In addition, the transmitting/receiving sections 103 may transmit configuration information for the unit of this retransmission control information. In addition, the transmitting/receiving sections 103 may transmit configuration information for the unit for retransmission of DL signals and/or UL signals. In addition, the transmitting/receiving sections 103 may transmit information indicating the number of CBs per CBG.

Figure 8:
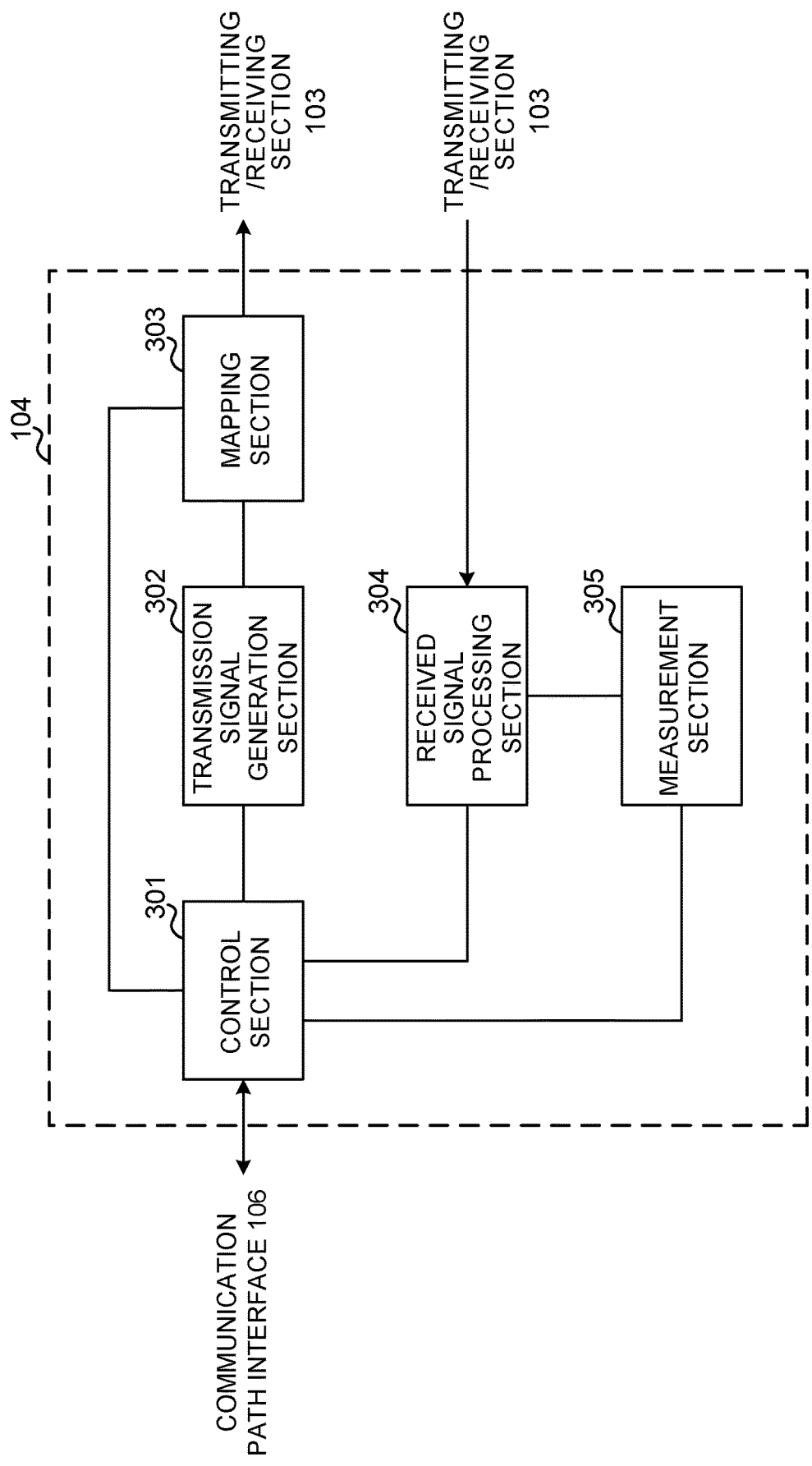
FIG. 8 is a diagram to show an exemplary functional structure of a radio base station according to the present embodiment.

FIG. 8 is a diagram to show an exemplary functional structure of a radio base station according to the present embodiment. Note that, although FIG. 8 primarily shows functional blocks that pertain to characteristic parts of the present embodiment, the radio base station 10 has other functional blocks that are necessary for radio communication as well. As shown in FIG. 8, the baseband signal processing section 104 has a control section 301, a transmission signal generation section 302, a mapping section 303, a received signal processing section 304 and a measurement section 305.

The control section 301 controls the whole of the radio base station 10. The control section 301 controls, for example, the scheduling of DL signals and UL signals, DL signal generation processes in the transmission signal generation section 302 (for example, encoding, modulation, etc.), mapping of DL signals in the mapping section 303, UL signal receiving processes in the received signal processing section 304 (for example, demodulation, decoding, etc.) and measurements in the measurement section 305.

To be more specific, the control section 301 selects the modulation scheme and the TBS for DL signals based on channel quality indicators (CQI) fed back from the user terminal 20. The control section 301 controls the transmission signal generation section 302 to encode DL signals based on the TBS and modulate DL signals based on the modulation scheme.

Also, when the TBS exceeds a predetermined threshold, the control section 301 may apply codeblock segmentation to DL signals, whereby a TBS is divided into multiple CBs. To be more specific, the control section 301 may control the transmission signal generation section 302 to perform coding and rate matching per CB, and control the mapping section 303 to map CWs in which individual CBs are concatenated. Also, when the TBS exceeds a predetermined threshold, the control section 301 may apply codeblock segmentation to UL signals.

The control section 301 also controls UL signal receiving processes (for example, demodulation, decoding, etc.). For example, the control section 301 may control the received signal processing section 304 to demodulate UL signal based on the modulation scheme indicated by the MCS index designated in DCI (UL grant), select the TBS based on the TBS index indicated by the MCS index and the number of resource blocks to be allocated, and decode DL signals based on this TBS.

Furthermore, the control section 301 controls UL signal receiving processes (for example, demodulation, decoding, etc.). For example, the control section 301 may control the received signal processing section 304 to demodulate UL signals based on the modulation scheme indicated by the MCS index designated in DCI (UL grant), select the TBS based on the TBS index indicated by the MCS index and the number of resource blocks to be allocated, and decode DL signals based on this TBS.

Furthermore, the control section 301 may control retransmission per CB (or per CBG) based on retransmission control information that indicate an ACK or a NACK per CB (or per CBG), from the user terminal 20.

Also, the control section 301 may control retransmission so that only CBs or CBGs for which NACKs are indicated are retransmitted. Alternatively, the control section 301 may control retransmission so that a CB or a CBG is bundled and retransmitted with a TB that is transmitted for the first time with a different HPN from that of the CB or the CBG, and/or bundled and retransmitted with a CB and/or a CBG that is retransmitted with a different HPN from that of the CB or the CBG.

In addition, the control section 301 may control the retransmission of each CB (or each CBG) constituting a UL signal based on the decoding (error correction) result of each CB constituting the UL signal (other examples). To be more specific, the control section 301 may exert control so that DCI (UL grant) for scheduling a CB that has failed to be decoded, or a CBG including this CB, is transmitted.

The control section 301 can be constituted by a controller, a control circuit or control apparatus that can be described based on general understanding of the technical field to which the present invention pertains.

The transmission signal generation section 302 may generate a DL signal (including at least one of DL data, DCI, a DL reference signal and control information that is provided by way of higher layer signaling) based on commands from the control section 301, and output this signal to the mapping section 303.

The transmission signal generation section 302 can be constituted by a signal generator, a signal generating circuit or signal generating apparatus that can be described based on general understanding of the technical field to which the present invention pertains.

The mapping section 303 maps the DL signal generated in the transmission signal generation section 302 to a radio resource, as commanded from the control section 301, and outputs this to the transmitting/receiving sections 203. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding, etc.) for UL signals transmitted from the user terminal 20. For example, the received signal processing section 304 may perform the decoding process in units of CBs based on commands from the control section 301.

To be more specific, the received signal processing section 304 may output the received signals and/or the signals after receiving processes to the measurement section 305. The measurement section 305 conducts measurements with respect to the received signals. The measurement section 305 can be constituted by a measurer, a measurement circuit or measurement apparatus that can be described based on general understanding of the technical field to which the present invention pertains.

The measurement section 305 may measure the received signals' received power (for example, RSRP (Reference Signal Received Power)), received quality (for example, RSRQ (Reference Signal Received Quality)), channel states and so on. The measurement results may be output to the control section 301.

(User Terminal)

Figure 9:
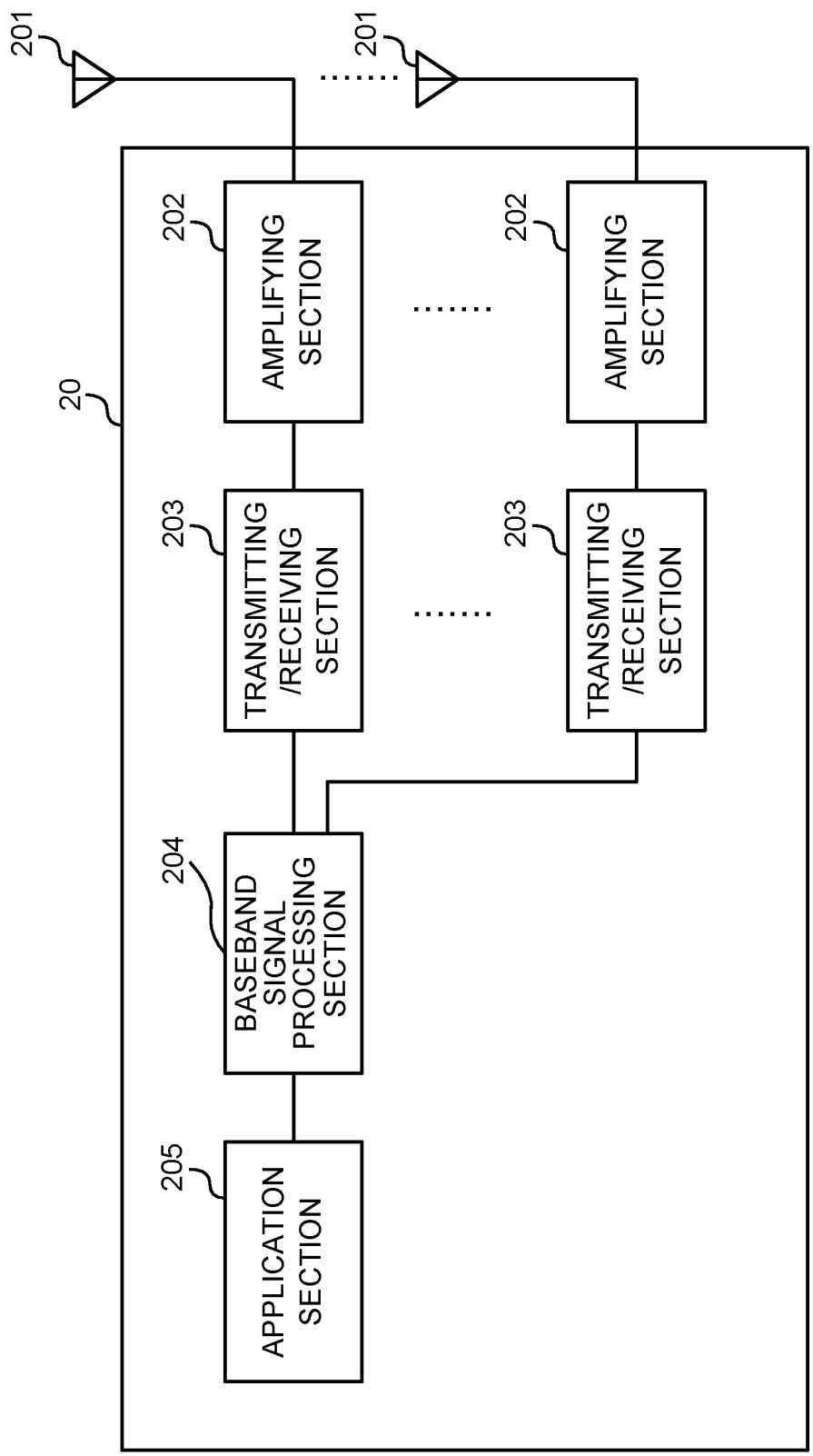
FIG. 9 is a diagram to show an exemplary overall structure of a user terminal according to the present embodiment.

FIG. 9 is a diagram to show an exemplary overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205.

Radio frequency signals that are received in multiple transmitting/receiving antennas 201 are amplified in the amplifying sections 202.

The transmitting/receiving sections 203 receive DL signals amplified in the amplifying sections 202. The received signals are subjected to frequency conversion and converted into the baseband signal in the transmitting/receiving sections 203, and output to the baseband signal processing section 204.

In the baseband signal processing section 204, the baseband signal that is input is subjected to at least one of an FFT process, error correction decoding, a retransmission control receiving process and so on. The DL data is forwarded to the application section 205. The application section 205 performs processes related to higher layers above the physical layer and the MAC layer.

Meanwhile, UL data is input from the application section 205 to the baseband signal processing section 204. The baseband signal processing section 204 performs transmission processes for retransmission control (for example, an HARQ transmission process), channel coding, rate matching, puncturing, a discrete Fourier transform (DFT) process, an IFFT process and so on, and the result is forwarded to each transmitting/receiving section 203. UCI (including, for example, at least one of an A/N in response to a DL signal, channel state information (CSI) and a scheduling request (SR), and/or others) is also subjected to channel coding, rate matching, puncturing, a DFT process, an IFFT process and so on, and the result is forwarded to the transmitting/receiving sections 203.

Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

In addition, the transmitting/receiving section sections 203 receive DL signals (for example, at least one of DCI (DL assignment and/or UL grant), DL data and DL reference signals), and transmit UL signals (for example, at least one of UL data, UCI, and UL reference signals).

In addition, the transmitting/receiving sections 203 transmit retransmission control information related to DL signals. As to how often the retransmission control information is transmitted, for example, the retransmission control information may be transmitted per CB, per CBG, per TB or for every one or more TBs (that is, ACKs or NACKs may be indicated per CB, per CBG, per TB or for every one or more TBs). In addition, the transmitting/receiving sections 203 may receive configuration information for the unit of this retransmission control information. In addition, the transmitting/receiving sections 203 may receive configuration information for the unit for retransmission of DL signals and/or UL signals. In addition, the transmitting/receiving sections 203 may receive information indicating the number of CBs per CBG.

A transmitting/receiving section 203 can be constituted by a transmitter/receiver, a transmitting/receiving circuit or transmitting/receiving apparatus that can be described based on general understanding of the technical field to which the present invention pertains. Furthermore, a transmitting/receiving section 203 may be structured as one transmitting/receiving section, or may be formed with a transmitting section and a receiving section.

Figure 10:
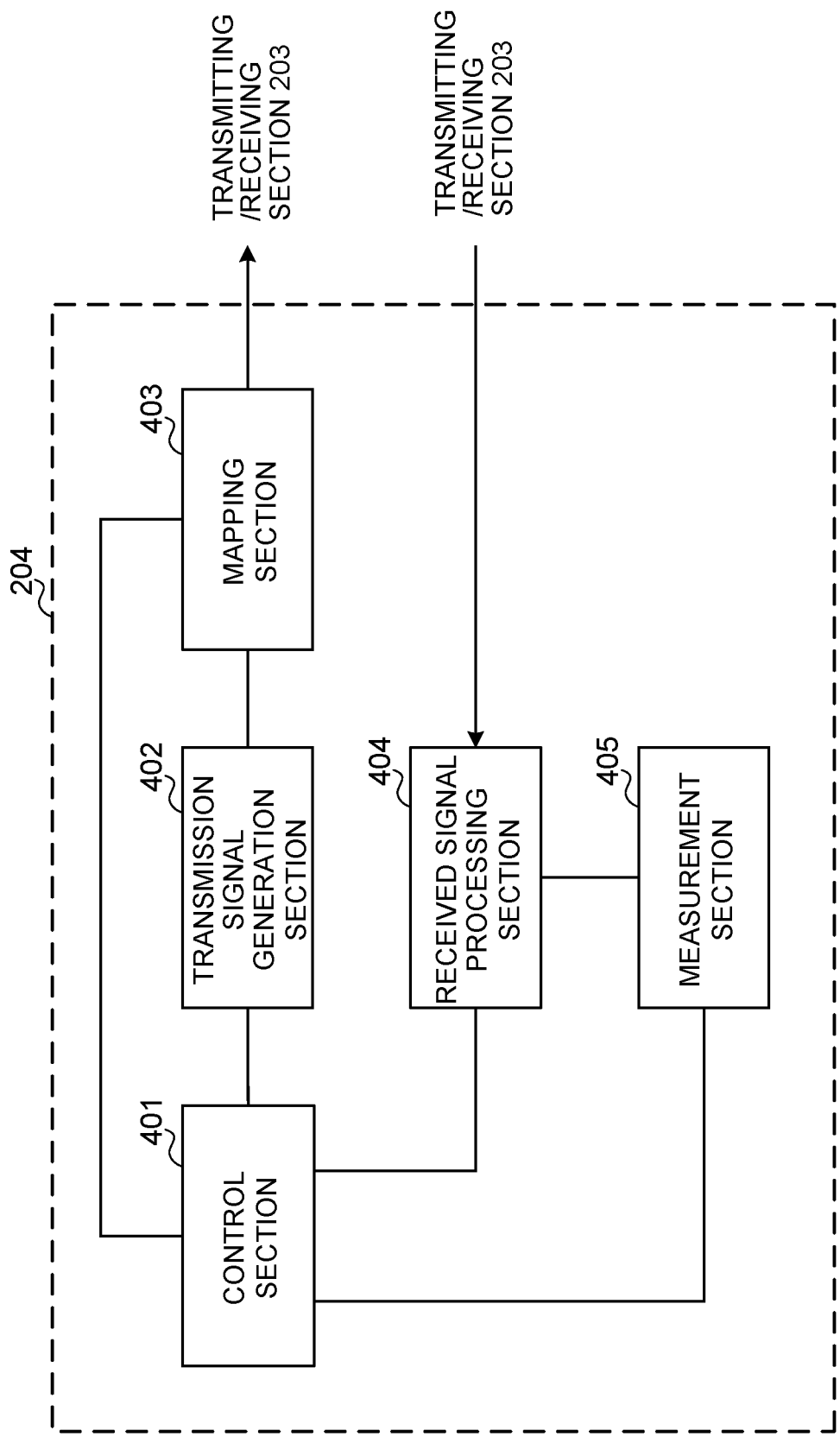
FIG. 10 is a diagram to show an exemplary functional structure of a user terminal according to the present embodiment.

FIG. 10 is a diagram to show an exemplary functional structure of a user terminal according to the present embodiment. Note that, although FIG. 10 primarily shows functional blocks that pertain to characteristic parts of the present embodiment, the user terminal 20 has other functional blocks that are necessary for radio communication as well. As shown in FIG. 10, the baseband signal processing section 204 provided in the user terminal 20 has a control section 401, a transmission signal generation section 402, a mapping section 403, a received signal processing section 404 and a measurement section 405.

The control section 401 controls the whole of the user terminal 20. The control section 401 controls, for example, DL signal receiving processes in the received signal processing section 404, UL signal generation processes in the transmission signal generation section 402, mapping of UL signals in the mapping section 403 and measurements in the measurement section 405.

To be more specific, the control section 401 controls DL signal receiving processes (for example, demodulation, decoding, etc.) based on DCI (DL assignment). For example, the control section 401 may control the received signal processing section 404 to demodulate DL signals based on the modulation scheme indicated by the MCS index designated in DCI. Also, the control section 401 may control the received signal processing section 404 to select TBS based on the TBS index indicated by the MCS index and the number of resource blocks to be allocated, and decode DL signals based on this TBS.

Also, the control section 401 may control generation and/or transmission of retransmission control information related to DL signals. To be more specific, the control section 401 may control generation and/or transmission of retransmission control information that indicates ACKs or NACKs per predetermined unit (for example, per CB or per CBG). To be more specific, the control section 401 may control generation of retransmission control information that indicates ACKs/NACKs for each CBG based on the demodulation and/or decoding result of each CB (error correction).

For example, when at least one CBG in a TB is subject to retransmission, the control section 401 may determine the number of bits of retransmission control information based on the total number of CBGs in the TB (first example). When at least one CBG in this TB is subject to retransmission, the retransmission control information may indicate ACKs or NACKs in response to all the CBGs in the TB (first example).

Alternatively, when at least one CBG in a TB is subject to retransmission, the control section 401 may determine the number of bits of retransmission control information based on the number of retransmitting CBGs (second example). When at least one CBG in a TB is subject to retransmission, the retransmission control information may indicate an ACK or a NACK in response to this retransmitting CBG (second example).

Also, the control section 401 may control restoration of TBs constituting DL signals. To be more specific, the control section 401 may control TBs to be restored based on CBs or CBGs that are initially transmitted, and/or retransmitted CBs/CBGs.

The control section 401 may also control receiving processes for retransmitting CBGs based on information related to retransmitting CBGs contained in DCI (DL assignment). For example, the control section 401 may control the process of combining data stored in the user terminal 20 (its soft buffer) and a retransmitting CBG based on the CBG index of the retransmitting CBG, included in DCI.

Also, the control section 401 controls the generation and transmission processes (for example, encoding, modulation, mapping etc.) of UL signals based on DCI (UL grant). For example, the control section 401 may control the transmission signal generation section 402 to modulate UL signals based on the modulation scheme that is indicated by the MCS index in DCI. Also, the control section 401 may control the transmission signal generation section 402 to select TBS based on the TBS index, which is indicated by the MCS index, and the number of resource blocks to allocate, and encode UL signals based on this TBS.

Also, when TBS exceeds a predetermined threshold, the control section 401 may apply codeblock segmentation, whereby a TBS is divided into multiple CBs, to UL signals. Alternatively, the control section 401 may apply codeblock segmentation to UL signals based on commands given via higher layer signaling and/or DCI.

In addition, the control section 401 may control the transmission of UL signals based on DCI from the radio base station 10. Also, the control section 401 may control retransmission of each CB (or each CBG) constituting UL signals based on DCI from the radio base station 10. To be more specific, the control section 401 may exert control so that CBs or CBGs specified by DCI are retransmitted by using the same numerology as that of initial transmission or by using different numerologies.

The control section 401 can be constituted by a controller, a control circuit or control apparatus that can be described based on general understanding of the technical field to which the present invention pertains.

The transmission signal generation section 402 generates retransmission control information for UL signals and DL signals as commanded from the control section 401 (including performing encoding, rate matching, puncturing, modulation and/or other processes), and outputs this to the mapping section 403. The transmission signal generation section 402 can be constituted by a signal generator, a signal generating circuit or signal generating apparatus that can be described based on general understanding of the technical field to which the present invention pertains.

The mapping section 403 maps the retransmission control information for UL signals and DL signals generated in the transmission signal generation section 402 to radio resources, as commanded from the control section 401, and outputs these to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes for DL signals (for example, demapping, demodulation, decoding, etc.). For example, the received signal processing section 404 may perform the decoding process on a per CB basis as commanded from the control section 401, and output the decoding result of each CB to the control section 401.

The received signal processing section 404 outputs the information received from the radio base station 10, to the control section 401. The received signal processing section 404 outputs, for example, broadcast information, system information, higher layer control information by higher layer signaling such as RRC signaling, L1/L2 control information (for example, UL grant, DL assignment, etc.) and so on to the control section 401.

The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The measurement section 405 measures channel states based on reference signals (for example, CSI-RS) from the radio base station 10, and outputs the measurement results to the control section 401. Note that channel state measurements may be conducted per CC.

The measurement section 405 can be constituted by a signal processor, a signal processing circuit or signal processing apparatus, and a measurer, a measurement circuit or measurement apparatus that can be described based on general understanding of the technical field to which the present invention pertains.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these multiple pieces of apparatus.

Figure 11:
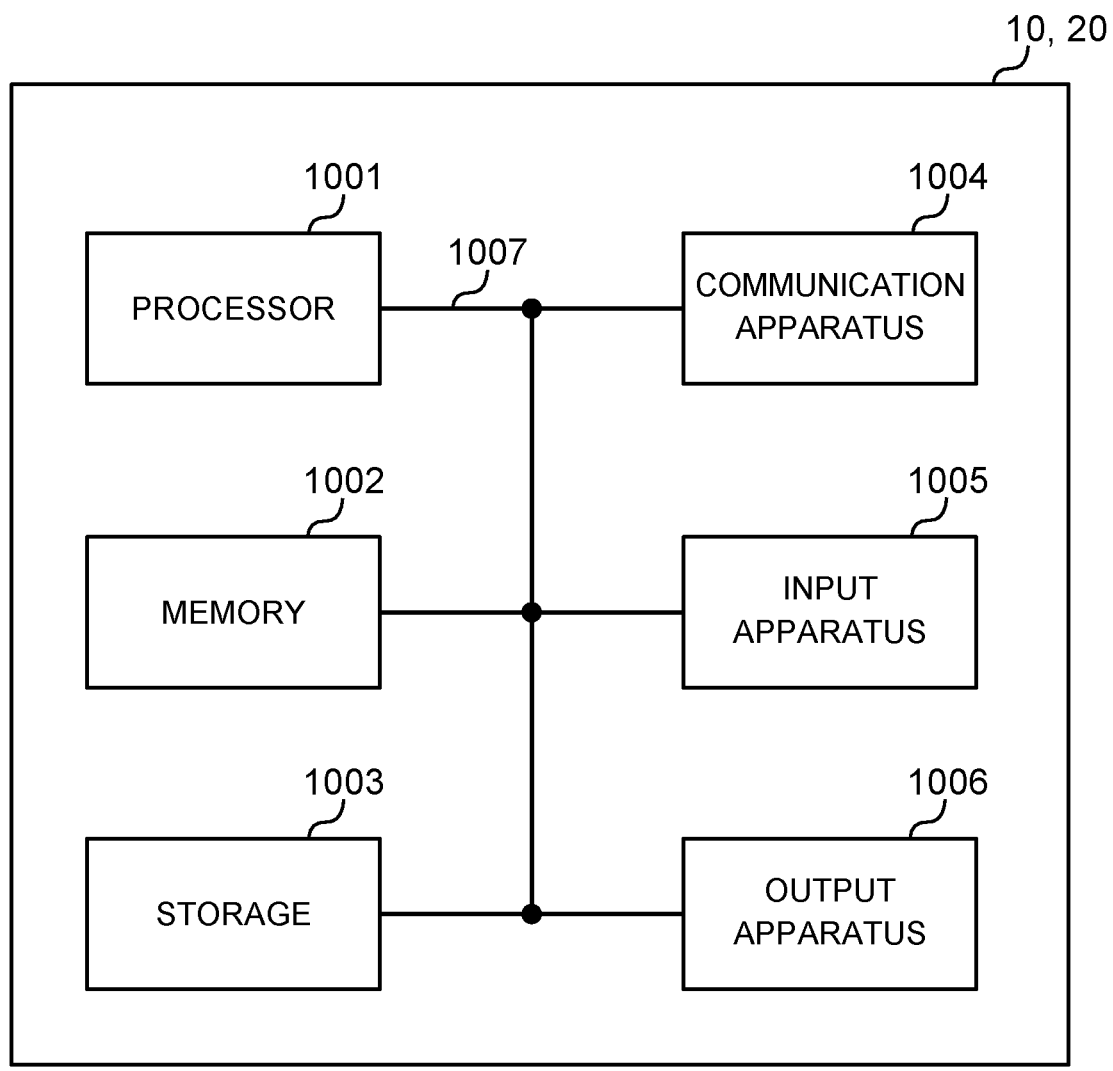
FIG. 11 is a diagram to show an exemplary hardware structure of a radio base station and a user terminal according to the present embodiment.

For example, the radio base station, user terminals and so on according to the present embodiment mode may function as a computer that executes the processes of the radio communication method of the present invention. FIG. 11 is a diagram to show an exemplary hardware structure of a radio base station and a user terminal according to the present embodiment. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only 1 processor 1001 is shown, a plurality of processors may be provided. Furthermore, processes may be implemented with 1 processor, or processes may be implemented in sequence, or in different manners, on one or more processors. Note that the processor 1001 may be implemented with one or more chips.

Each function of the radio base station 10 and user terminal 20 is implemented by allowing predetermined software (programs) to be read on hardware such as the processor 1001 and the memory 1002, and by allowing the processor 1001 to do calculations, the communication apparatus 1004 to communicate, the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and others may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

VARIATIONS

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. A subframe may be a fixed time length (for example, 1 ms) not dependent on the numerology.

A slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of minislots. Each minislot may be comprised of one or more symbols in the time domain.

A radio frame, a subframe, a slot, a minislot and a symbol all represent the time unit in signal communication. A radio frame, a subframe, a slot, a minislot and a symbol may be each called by other applicable names. For example, 1 subframe may be referred to as a "transmission time interval (TTI)," or a plurality of consecutive subframes may be referred to as a "TTI," or 1 slot or mini-slot may be referred to as a "TTI." That is, a subframe and a TTI may be a subframe (1 ms) in existing LTE, may be a shorter period than 1 ms (for example, 1 to 13 symbols), or may be a longer period of time than 1 ms.

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this. The TTI may be the transmission time unit of channel-encoded data packets (transport blocks) or may be the unit of processing in scheduling, link adaptation and so on. Note that, when 1 slot or 1 minislot is referred to as a "TTI," one or more TTIs (that is, one or multiple slots or one or more minislots) may be the minimum time unit of scheduling. Also, the number of slots (the number of minislots) to constitute this minimum time unit of scheduling may be controlled.

A TTI having a time length of 1 ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," a "partial TTI" (or a "fractional TTI"), a "shortened subframe," a "short subframe," and so on.

A resource block (RB) is the unit of resource allocation in the time domain and the frequency domain, and may include one or a plurality of consecutive subcarriers in the frequency domain. Also, an RB may include one or more symbols in the time domain, and may be 1 slot, 1 minislot, 1 subframe or 1 TTI in length. 1 TTI and 1 subframe each may be comprised of one or more resource blocks. Note that an RB may be referred to as a "physical resource block (PRB (Physical RB))," a "PRB pair," an "RB pair," and so on.

Furthermore, a resource block may be comprised of one or more resource elements (REs). For example, 1 RE may be a radio resource field of 1 subcarrier and 1 symbol.

Note that the structures of radio frames, subframes, slots, minislots, symbols and so on described above are merely examples. For example, configurations pertaining to the number of subframes included in a radio frame, the number of slots included in a subframe or a radio frame, the number of mini-slots included in a slot, the number of symbols included in a slot or a mini-slot, the number of subcarriers included in an RB, the number of symbols in a TTI, the duration of symbols, the duration of cyclic prefixes (CPs) and so on can be changed in a variety of ways.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information, or by reporting a different piece of information).

Decisions may be made in values represented by 1 bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, 3) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may also be referred to as, for example, a "subscriber station," a "mobile unit," a "subscriber unit," a "wireless unit," a "remote unit," a "mobile device," a "wireless device," a "wireless communication device," a "remote device," a "mobile subscriber station," an "access terminal," a "mobile terminal," a "wireless terminal," a "remote terminal," a "handset," a "user agent," a "mobile client," a "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and/or "downlink" may be interpreted as "side." For example, an "uplink channel" may be interpreted as a "side channel."

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by higher nodes (upper nodes). In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The examples/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideB and), Bluetooth (registered trademark) and other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method of distinguishing between two or more elements. In this way, reference to the first and second elements does not imply that only 2 elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between 2 elements that are "connected" or "coupled" to each other. The coupling or connection between the elements may be physical, logical or a combination thereof. As used herein, 2 elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency fields, microwave regions and optical (both visible and invisible) regions.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
a receiver that receives a transport block (TB) including one or more codeblock groups (CBGs), the CBG including one or more codeblocks; and
a processor that controls transmission of retransmission control information that indicates an ACK or a NACK per CBG,
wherein, when at least one CBG in the TB is retransmitted and even if there is at least one CBG, other than the retransmitted CBG, in the TB that is not retransmitted, the processor, in response to all of the CBGs in the TB, controls transmission of ACKs for all CBGs that are successfully decoded and NACKs for all CBGs that have failed in decoding before retransmission of the CBG among all of the CBGs in the TB.

2. The terminal according to claim 1, wherein the receiver receives information indicating the CBG that is subjected to retransmission.

3. A radio communication method for a terminal, comprising:
receiving a transport block (TB) including one or more codeblock groups (CBGs), the CBG including one or more codeblocks; and
controlling transmission of retransmission control information that indicates an ACK or a NACK per CBG;
wherein when at least one CBG in the TB is retransmitted and even if there is at least one CBG, other than the retransmitted CBG, in the TB that is not retransmitted, the terminal, in response to all of the CBGs in the TB, controls transmission of ACKs for all CBGs that are successfully decoded and NACKs for all CBGs that have failed in decoding before retransmission of the CBG among all of the CBGs in the TB.

4. A base station comprising:
a transmitter that transmits a transport block (TB) including one or more codeblock groups (CBGs), the CBG including one or more codeblocks; and
a processor that controls reception of retransmission control information that indicates an ACK or a NACK per CBG,
wherein, when at least one CBG in the TB is retransmitted and even if there is at least one CBG, other than the retransmitted CBG, in the TB that is not retransmitted, the processor, in response to all of the CBGs in the TB, controls reception of ACKs for all CBGs that are successfully decoded and NACKs for all CBGs that have failed in decoding before retransmission of the CBG among all of the CBGs in the TB.

5. A system comprising a terminal and a base station, wherein:
the terminal comprises:
a receiver that receives a transport block (TB) including one or more codeblock groups (CBGs), the CBG including one or more codeblocks; and
a processor that controls transmission of retransmission control information that indicates an ACK or a NACK per CBG,
wherein, when at least one CBG in the TB is retransmitted and even if there is at least one CBG, other than the retransmitted CBG, in the TB that is not retransmitted, the processor of the terminal, in response to all of the CBGs in the TB, controls transmission of ACKs for all CBGs that are successfully decoded and NACKs for all CBGs that have failed in decoding before retransmission of the CBG among all of the CBGs in the TB, and
the base station comprises:
a transmitter that transmits the TB including one or more CBGs; and
a processor that controls reception of the retransmission control information that indicates an ACK or a NACK per CBG,
wherein, when at least one CBG in the TB is retransmitted and even if there is at least one CBG, other than the retransmitted CBG, in the TB that is not retransmitted, the processor of the base station, in response to all of the CBGs in the TB, controls reception of ACKs for all CBGs that are successfully decoded and NACKs for all CBGs that have failed in decoding before retransmission of the CBG among all of the CBGs in the TB.

* * * * *